(No Model.)
W. T. MAYNARD.
DOUBLE SET PLOW.
No. 380,214.  Patented Mar. 27, 1888.
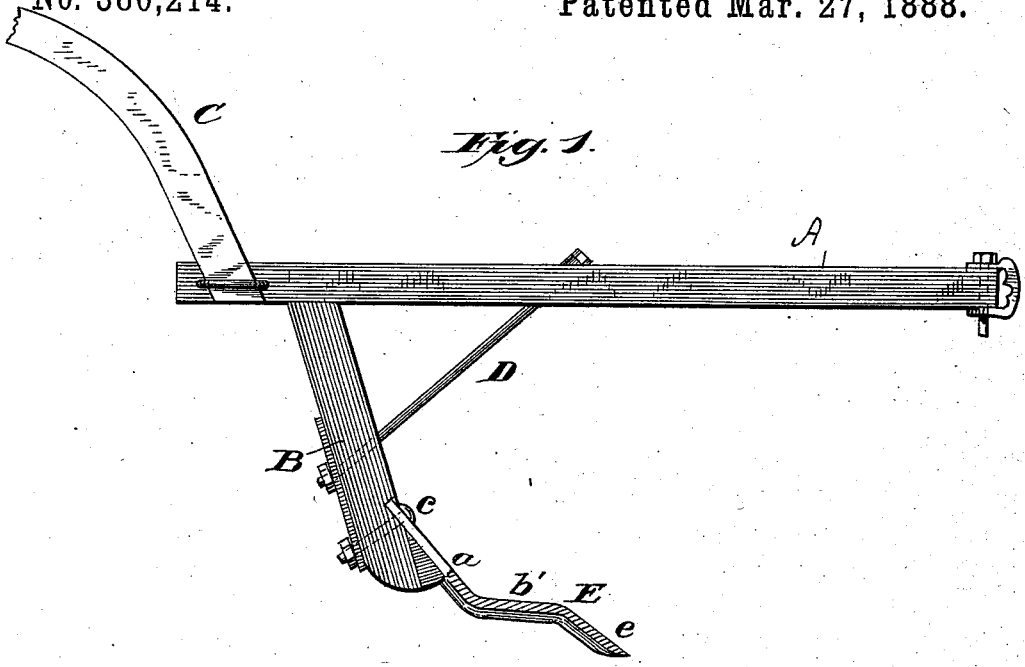
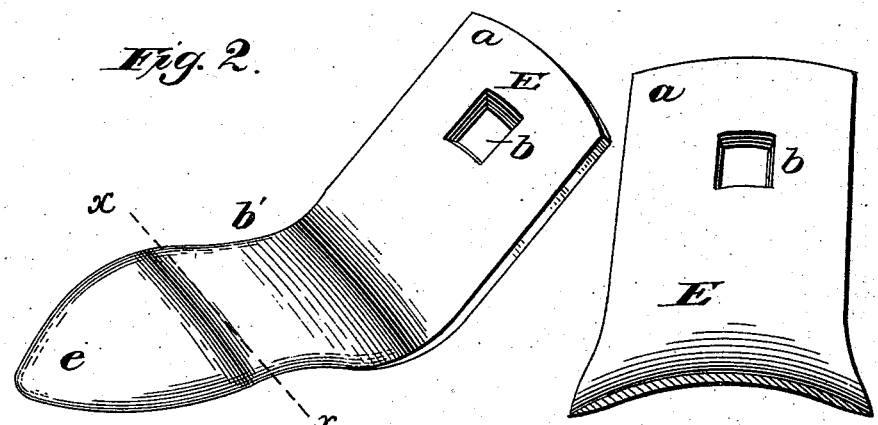
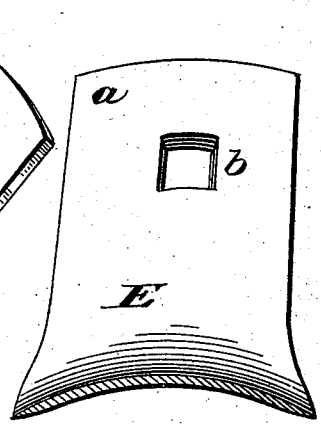
WITNESSES.
F. L. Ourand.
J. F. Coleman.
INVENTOR.
W. T. Maynard.
By H. N. Jenkins.
his Attorney.

UNITED STATES PATENT OFFICE.

WILLIAM T. MAYNARD, OF FORSYTH, GEORGIA.

DOUBLE-SET PLOW.

SPECIFICATION forming part of Letters Patent No. 380,214, dated March 27, 1888.

Application filed July 1, 1887. Serial No. 243,125. (No model.)

*To all whom it may concern:*

Be it known that I, WILLIAM T. MAYNARD, a citizen of the United States, and a resident of Forsyth, county of Monroe, State of Georgia, have invented new and useful Improvements in Double-Set Plows, of which the following is a full and exact description, reference being had to the accompanying drawings, making part of this specification.

This invention relates to certain improvements in plows of various descriptions—such as scooter-plows, bolter-plows, bull-tongue plows, and the variety of shovel-plows used for agricultural and engineering purposes where it is necessary to break up and remove hard or packed earth; and it consists in constructing the plowshare or shovel with a "double set," as hereinafter described, so as to pulverize the earth while raising and throwing it aside, as well as to relieve the draft-animals of undue strain. These objects I attain by the means illustrated in the accompanying drawings, in which—

Figure 1 represents a side elevation of a plow embodying my invention; Fig. 2, a perspective view of my improved plowshare or shovel detached, and Fig. 3 a transverse sectional view taken on the line *x x* of Fig. 2.

Referring to the drawings, the letter A indicates the main or draft beam of the plow, which may be of the ordinary or any approved form, and B the inclined share or shovel supporting beam or standard.

The letter C indicates the handles, and D the braces which bind the share or shovel supporting beams to the main or draft beam.

The letter E indicates the improved share or shovel. This is constructed of metal, either cast or wrought, as may be found most desirable. The said shovel or share is formed in one piece of metal with a flat shank, *a*, having a square or other shaped bolt-aperture, *b*, through which the fastening-bolt *c* may be passed to secure it to the supporting-beam of the plow. From the shank *a*, which is so set as to be seated at an angle to the supporting-beam, the shovel or plowshare is bent, as shown at *b'*, in such manner and at such an angle to the shank as to be parallel with the main or draft beam of the plow, and from the part *b'* the share or shovel is set or bent downward to its point *e*, so as to enter the soil and break it to the proper depth.

The point or excavating portion *e* of the share or shovel is made concave or hollow on its under side and convex or bulged on its upper side, and its edges are beveled from the rear to the front, so as to clearly cut the soil and work through it with the least possible resistance. By thus forming the said point or excavating portion of the share or shovel it will be seen that it is automatically sharpened by use, as the wear is at the edges entirely, the earth tending to keep the said edges sharp and in good cutting condition until the share is worn out.

In the operation of my invention the point of the plowshare or shovel is forced into the ground to the requisite depth, and as the plow is drawn forward the loosened earth is pressed up the inclined point and over the rear of same onto the horizontal part of the share, from whence it is again raised and then thrown aside by the forward pressure of the shank against the same. One of the merits of this form of share or shovel is that it prevents riding or resting on the handles of the plow, as any attempt on the part of the operator to do so will cause the heel or rear under portion of the horizontal part of the share to impinge against the ground and force the point upwardly out of same.

Having thus described my invention, what I claim, and desire to secure by Letters Patent, is—

1. A plowshare formed of a single piece of flat metal, the shank provided with a bolt-hole, and the lower portion pointed and provided with a double set, the first set curved forwardly from the shank and the second set inclined diagonally downward toward the point, the space between the two sets made straight and horizontal, substantially as and for the purpose set forth.

2. The combination, with the main and supporting beams of a plow, of the double set or bent plowshare or shovel formed in one piece, with a horizontal body having a downwardly-inclined point and an upwardly-inclined rear portion or shank, the space between the two sets horizontal, and the shank adapted to be secured to the supporting-beam of the plow, as and for the purpose set forth.

In testimony whereof I have affixed my signature in presence of two witnesses.

WILLIAM T. MAYNARD.

Witnesses:
W. T. LAWSON,
R. G. ANDERSON.